(12) United States Patent
Leum et al.

(10) Patent No.: US 9,944,475 B1
(45) Date of Patent: Apr. 17, 2018

(54) DOCK LEVELER

(71) Applicant: Leum Engineering, Inc., Excelsior, MN (US)

(72) Inventors: Grant Leum, Excelsior, MN (US); Eric Demerath, Shepherd, MI (US)

(73) Assignee: Leum Engineering, Inc., Excelsior, MN (US)

( * ) Notice: Subject to any disclaimer, the term of this patent is extended or adjusted under 35 U.S.C. 154(b) by 0 days.

(21) Appl. No.: 15/450,311

(22) Filed: Mar. 6, 2017

(51) Int. Cl.
*B65G 69/28* (2006.01)

(52) U.S. Cl.
CPC ..... *B65G 69/2841* (2013.01); *B65G 69/2823* (2013.01)

(58) Field of Classification Search
CPC ............ B65G 69/2841; B65G 69/2823; B65G 69/2817; B65G 69/287; B65G 69/2811
See application file for complete search history.

(56) References Cited

U.S. PATENT DOCUMENTS

| | | | | |
|---|---|---|---|---|
| 3,685,077 A * | 8/1972 | Wiener | ............... | B65G 69/2811 14/71.3 |
| 3,806,976 A * | 4/1974 | Yoon | .................. | B65G 69/2858 14/69.5 |
| 4,065,824 A * | 1/1978 | Ellis | .................. | B65G 69/2841 14/71.3 |
| 4,624,446 A | 11/1986 | Gould | | |
| 4,665,579 A * | 5/1987 | Bennett | .............. | B65G 69/2841 14/71.1 |
| 4,689,846 A * | 9/1987 | Sherrod | ............. | B65G 69/2841 14/71.3 |
| 4,765,792 A | 8/1988 | Cherry et al. | | |
| 4,865,507 A * | 9/1989 | Trickle | ............... | B65G 69/2823 14/71.1 |
| 4,935,979 A * | 6/1990 | Walker | ............... | B65G 69/2841 14/71.1 |
| 5,195,205 A * | 3/1993 | Cook | ................. | B65G 69/2841 14/71.1 |
| 5,214,818 A * | 6/1993 | Cook | ................. | B65G 69/2841 14/71.1 |
| 5,311,628 A * | 5/1994 | Springer | ............ | B65G 69/2823 14/71.1 |
| 5,657,502 A * | 8/1997 | Ellis | ................... | B65G 69/2841 14/71.1 |
| 6,205,606 B1 * | 3/2001 | Zibella | ............... | B65G 69/2835 14/69.5 |

(Continued)

*Primary Examiner* — Abigail A Risic
(74) *Attorney, Agent, or Firm* — Jansson Munger McKinley & Kirby Ltd.

(57) ABSTRACT

A dock leveler for an edge of a loading dock which includes a frame, a two-piece lip, a lift assist spring and an assist bar. The lift assist spring is connected on a first end to the bottom side of the lip at the pivot point and connected on a second end to the frame. The assist bar is used to move the lip between the extended/engaged and retracted/disengaged positions. By attaching the lip assist spring to the bottom of the distal lip portion, the force exerted on the lip causes it to maintain closure at the pivot point between the distal and proximal lip portions when in the extended/engaged position. Additionally, the distance between the lift assist spring and lip is minimized thereby dampening a fall distance when the lip becomes unsupported by a truck trailer; and the amount of force needed to actuate the assist bar is minimized.

9 Claims, 5 Drawing Sheets

(56) References Cited

U.S. PATENT DOCUMENTS

| | | |
|---|---|---|
| 6,368,043 B1 | 4/2002 | Leum et al. |
| 6,442,783 B1 * | 9/2002 | Yoon ................. B65G 69/2841 14/69.5 |
| D712,112 S | 8/2014 | Leum |

* cited by examiner

DOCK LEVELER

FIELD

This invention relates to dock levelers and more particularly to a dock leveler for an edge of a loading dock.

BACKGROUND

A variety of truck levelers have been devised to adjust the height of different trailers to properly match the deck of the trailer to the height of the dock. By aligning the height of the trailer and the dock the loading and unloading of cargo is facilitated.

One such device is seen in U.S. Pat. No. 4,624,446 (Gould) which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock.

A similar device is disclosed in U.S. Pat. No. 4,765,792 (Cherry, et al.,) which also discloses a pivotally-mounted and hydraulically-raised platform. In addition to the disclosure of Gould, the device includes mounting the hydraulics inwardly from the non-mounted end of the platform and an aperture in the non-mounted end of the platform to accommodate a truck restraining device.

Another design is disclosed in U.S. Pat. No. 6,368,043 (Leum, et al.,) which teaches a low-profile truck leveler. In this design a low-profile leveler is enabled through the use of a raised rear beam and two lateral beams that extend above the upper surface of the platform. In addition, a central beam adds further to the leveler's strength and rigidity.

Some dock levelers of the prior art have certain shortcomings and disadvantages to which this device is drawn. Specifically, it would be advantageous to have an edge of dock leveler which has a lip that securely maintains closure at the pivot point between the distal and proximal lip portions when in the extended/engaged position. It would also be advantageous to minimize the distance between the lift assist spring and lip thereby dampening the possible fall distance if the lip becomes unsupported by a truck trailer. It would also be advantageous to have an edge of dock leveler with a mechanical assist bar so that the amount of force needed by a user to actuate the mechanical assist bar is minimized.

In summary, there are problems and shortcomings in the prior art dock levelers and it is to these needs that this device is drawn.

OBJECTS

It is an object of this invention to provide an edge of dock leveler which has a lip that securely maintains closure at the pivot point between the distal and proximal lip portions when in the extended/engaged position.

Another object of this invention is to provide such an edge of dock leveler which minimizes the distance between the lift assist spring and lip thereby dampening the possible fall distance if the lip becomes unsupported by a truck trailer.

Yet another object of this invention is to provide such an edge of dock leveler with a mechanical assist bar so that the amount of force needed by a user to actuate the mechanical assist bar is minimized.

These and other objects of the invention will be apparent from the following descriptions and from the drawings.

SUMMARY

In a first embodiment of the present invention a dock leveler for an edge of a loading dock and being operable between an extended/engaged position and a retracted/disengaged position and includes a frame mounted to the edge of a loading dock and including two opposed bumper sections; a lip having a distal portion and a proximal portion, the distal and proximal portions being hingedly connected at a pivot point, the proximal portion also being hingedly connected to the frame, the lip having a top side and a bottom side and able to be activated between an extended/engaged position with a truck bed and a retracted/disengaged position; at least one lift assist spring connected on a first end to the bottom side at the pivot point and connected on a second end to the frame and a mechanical assist bar operated by a user to move the lip between the extended/engaged and retracted/disengaged positions. The embodiment further includes that by attaching the lip assist spring to the bottom side of the distal lip portion, the force exerted on the lip causes it to maintain closure at the pivot point between the distal and proximal lip portions when in the extended/engaged position, the distance between the lift assist spring and lip is minimized thereby dampening a fall distance when the lip becomes unsupported by a truck trailer and the amount of force needed by a user to actuate the mechanical assist bar is minimized.

In highly preferred embodiments when the lip is resting on a truck trailer there is no separation between the distal and proximal portions. Preferably, the stronger and larger the at least one lift assist spring is, less force is needed by an operator to move the mechanical assist bar. It is also preferable that the at least one lift assist spring will cause the distal and proximal portions to rotate together and onto a top of a truck trailer.

The mechanical assist bar will extend the lip to the extended/engaged position forcing the at least one lift assist spring to move from a position behind the pivot point into a position forward of the pivot point and into a loading position in highly preferred embodiments. Preferably, in the retracted/disengaged position, the at least one lift assist spring is behind the pivot point which keeps the lip from accidentally rotating into the extended/engaged position. It is also preferable that by minimizing the distance between the at least one lift assist spring location and the pivot point, this facilitates closure of the proximal and distal portions together when the lip is unsupported by the truck trailer.

In some preferred embodiments, the lift assist spring is a gas spring having compressed gas, a cylinder and a piston. In other preferred embodiments, the at least one lift assist spring is a metal spring. Other preferred embodiments include one lift assist spring which can be two lift assist springs positioned equidistant from each other.

In some preferred embodiments the dock leveler can be mounted onto an end of a mobile loading dock or a stationary loading dock.

DETAILED DESCRIPTION OF PREFERRED EMBODIMENTS

Figure 1:
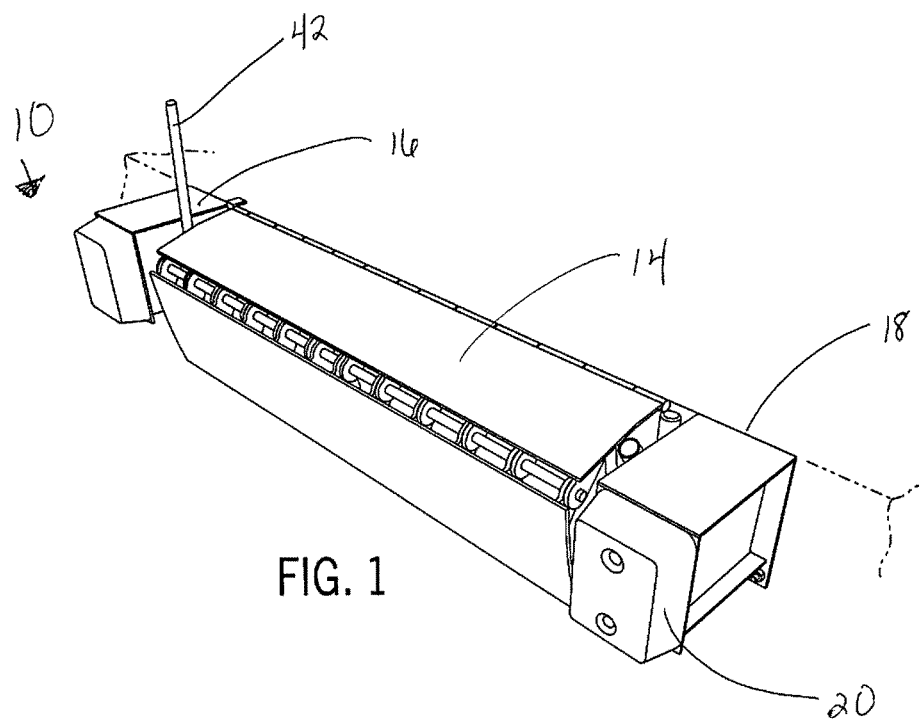
FIG. 1 is a perspective view of the dock leveler.

A preferred embodiment of the present invention is shown in FIGS. 1-6. A second embodiment of the present invention is shown in FIGS. 7-12. The edge of dock leveler 10, as shown in FIG. 1-6, is operable between an extended/engaged position 12 and a retracted/disengaged position 14 and includes a frame 16 mounted to the edge of a loading dock 18 and including two opposed bumper sections 20; a lip 22 having a distal portion 24 and a proximal portion 26, distal and proximal portions 24, 26 being hingedly connected at a pivot point 28, proximal portion 26 also being hingedly connected to frame 16. Lip 22 has a top side 30 and a bottom side 32 and is able to be activated between an extended/engaged position 12 with a truck bed 34 and a retracted/disengaged position 14. At least one lift assist spring 36 is connected on a first end 38 to bottom side 32 at pivot point 28 and connected on a second end 40 to frame 16 and a mechanical assist bar 42 is operated by a user to move lip 22 between the extended/engaged 12 and retracted/disengaged positions 14.

By attaching lip assist spring 36 to bottom side 32 of distal portion 24, the force exerted on lip 22 causes it to maintain closure at pivot point 28 between distal and proximal portions 24, 26 when in extended/engaged position 12. The distance between lift assist spring 36 and lip 22 is minimized thereby dampening a fall distance when lip 22 becomes unsupported by truck bed 34 and the amount of force needed by a user to actuate mechanical assist bar 42 is minimized.

The spring force in the lip in the extended/engaged position 12 (since spring force is under and acting in front of the pivot point 28) will try and rotate proximal 26 and distal 24 portions together which keeps the portions 24, 26 from separating as seen in FIGS. 3-6, FIGS. 1-5 illustrate that when lip 22 is resting on truck bed 34 there is no separation between distal and proximal portions 24, 26. The stronger and larger the at least one lift assist spring 36 is, the less force is needed by an operator to move mechanical assist bar 42 and begin the process of engaging lip 22 with truck bed 34 or disengaging with truck bed 34.

FIGS. 2-6 illustrate that the location of at least one lift assist spring 36 will cause distal and proximal portions 24, 26 to rotate together into contact and onto a top of truck bed 34. Mechanical assist bar 42 will extend lip 22 to extended/engaged position 12 forcing at least one lift assist spring 36 to move from a position behind pivot point 28 into a position forward of pivot point 28 and into a loading position as seen in FIGS. 2-6.

Figure 4:
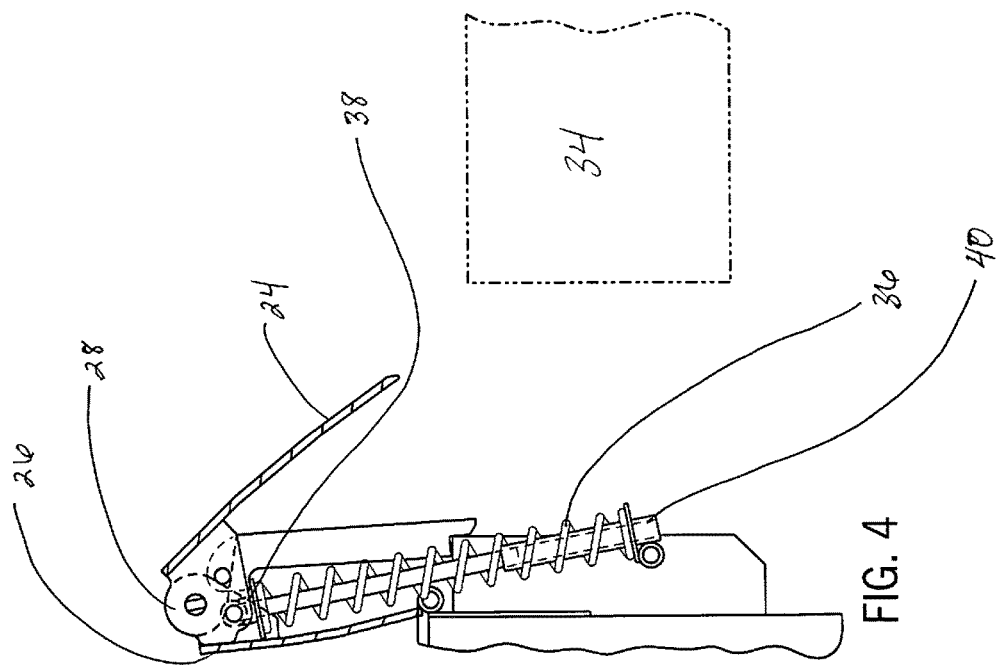
FIG. 4 is a side view of the dock leveler in FIG. 1 with the lip partially extended.
Figure 3:
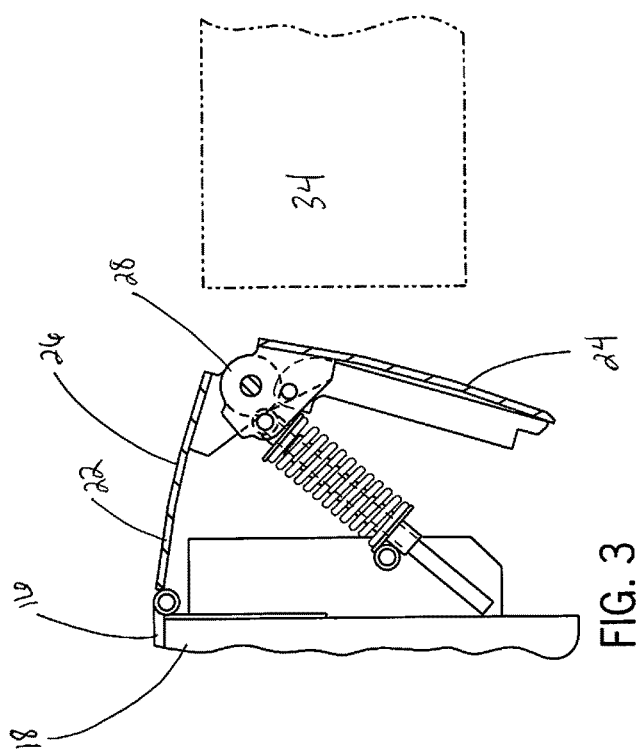
FIG. 3 is a side view of the dock leveler in FIG. 1 with the lip partially extended.
Figure 6:
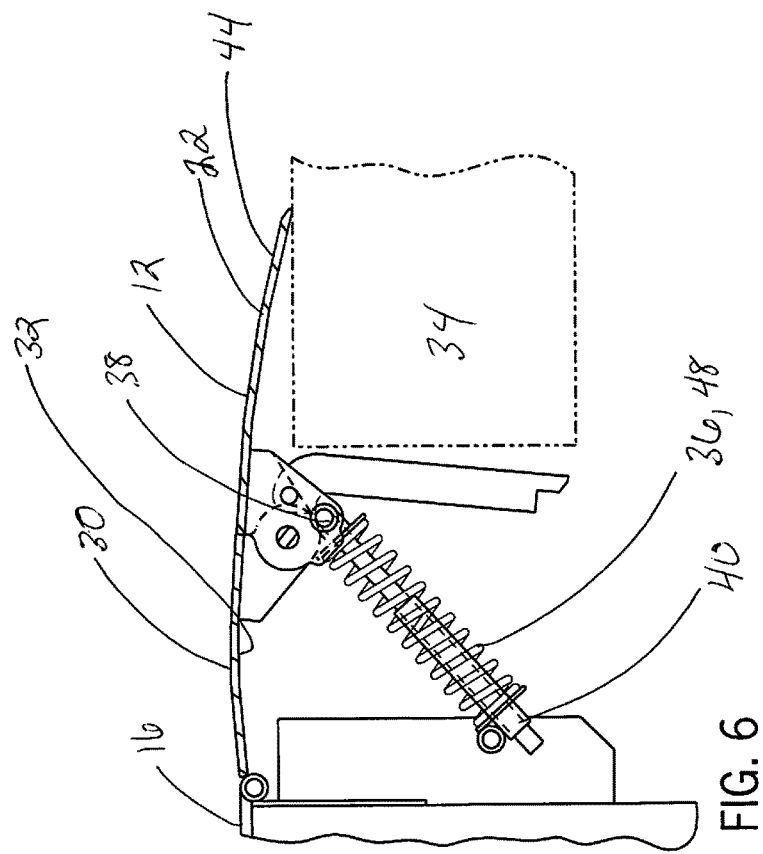
FIG. 6 is a side view of the dock leveler in FIG. 1 with the lip fully extended and resting on a truck bed.
Figure 5:
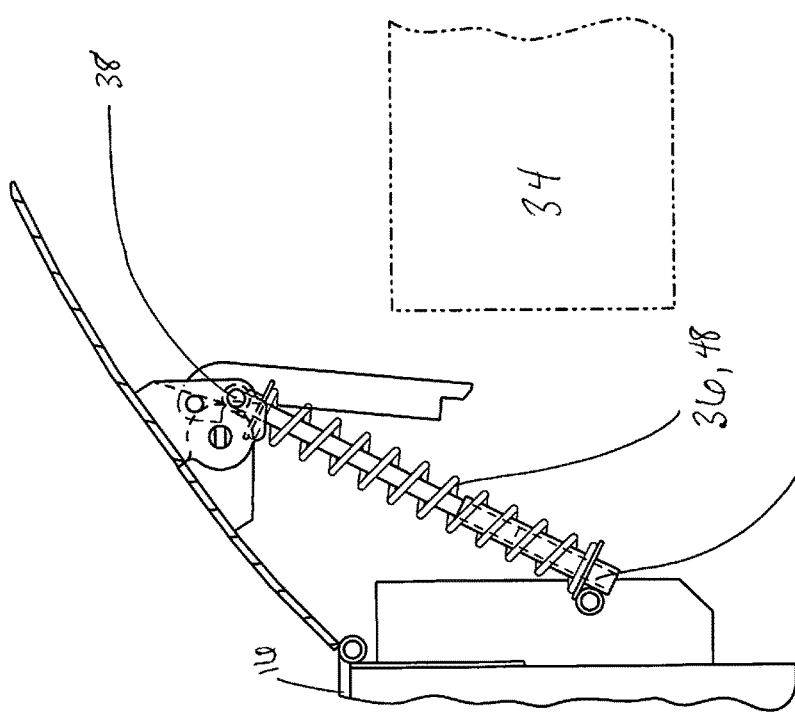
FIG. 5 is a side view of the dock leveler in FIG. 1 with the lip almost fully extended.
Figure 9:
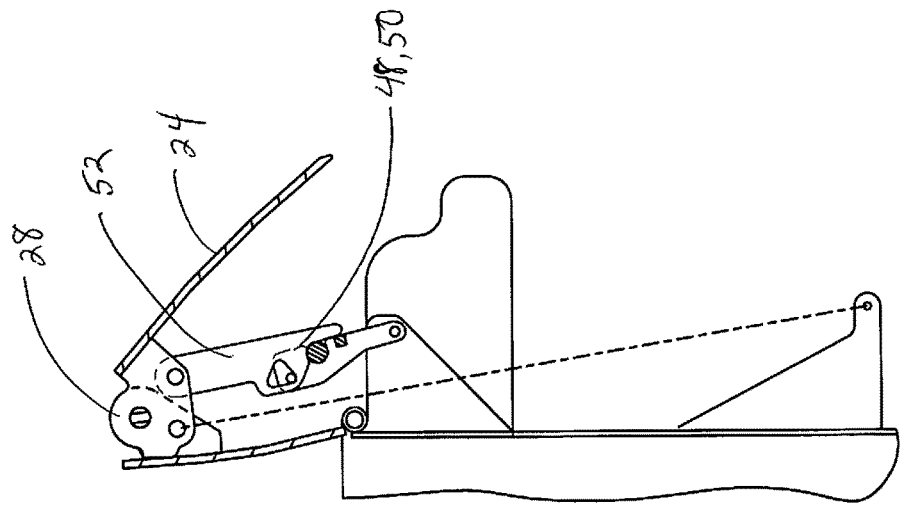
FIGS. 7-12 are side views of a second embodiment of the dock leveler illustrating the extension and retraction of the lip member.
Figure 8:
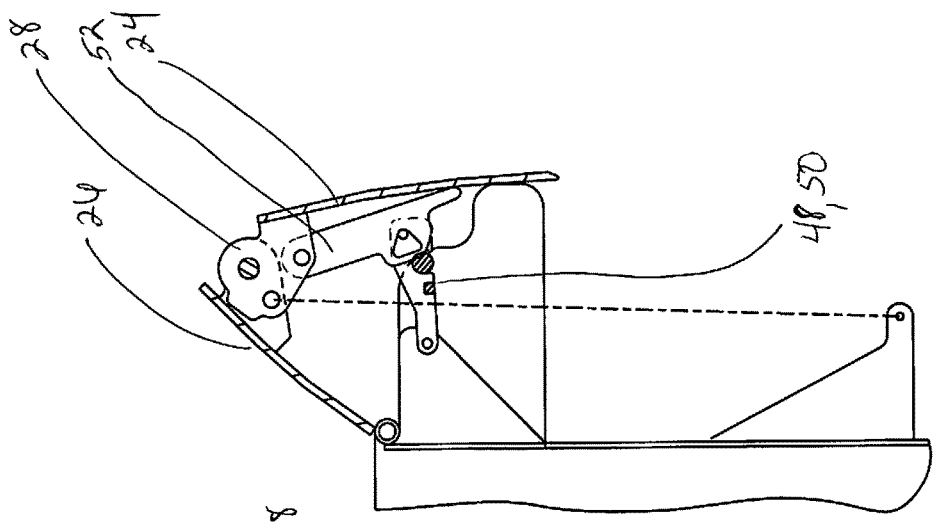
Figure 7:
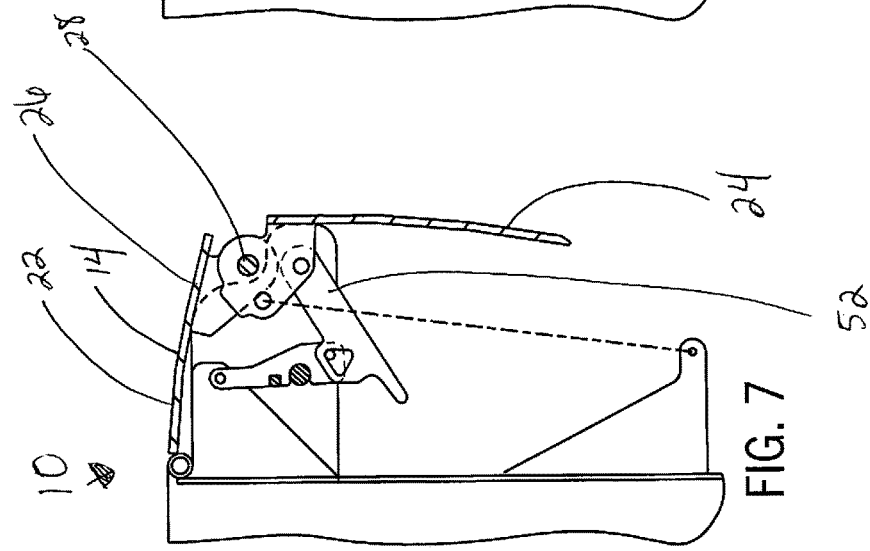
Figure 12:
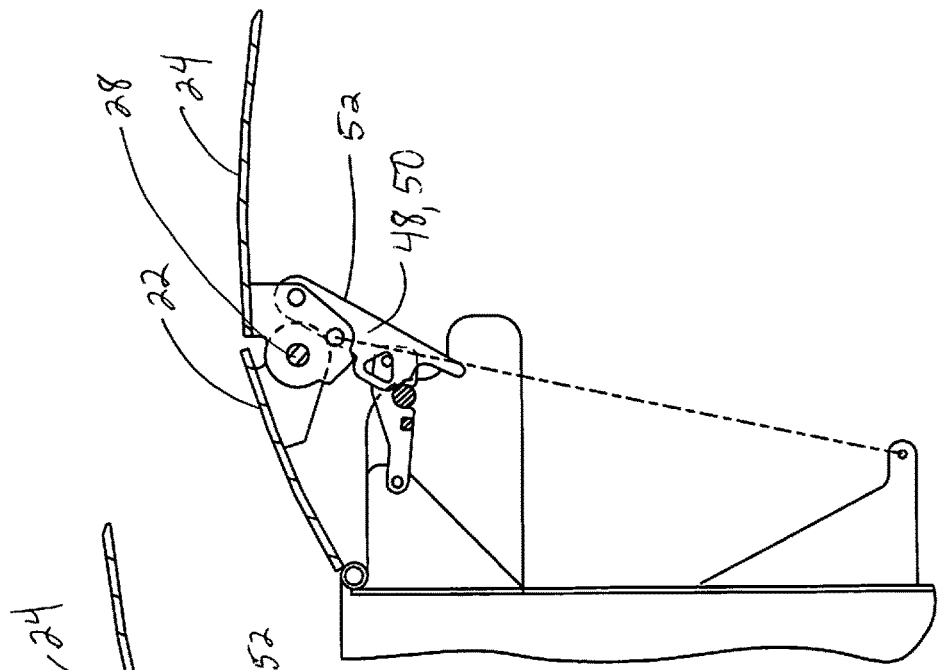

In retracted/disengaged position 14 at least one lift assist spring 36 is behind pivot point 28 which keeps lip 22 from accidentally rotating into extended/engaged position 12 as seen in FIG. 4. Minimizing the distance between at least one lift assist spring 36 location and pivot point 28 facilitates closure of proximal and distal portions 24, 26 together when lip 22 is unsupported by truck bed 34.

FIGS. 1-12 show that the dock leveler can be mounted onto an end of a mobile loading dock or a stationary loading dock (not shown). FIGS. 7-12 illustrate that lift assist spring 36 can be a gas spring 48 having compressed gas, a cylinder and a piston 50. Alternatively, lift assist spring 36 is a metal spring as seen in FIGS. 1-6.

As seen in FIGS. 1-6, lift assist spring 36 can be two lift assist springs 36 positioned equidistant from each other. Gas spring 48 allows constant pressure for lifting and dampening. Gas spring 48 combined with pivot point 28 gives the user excellent performance and provides a safer lifting force.

Figure 2:
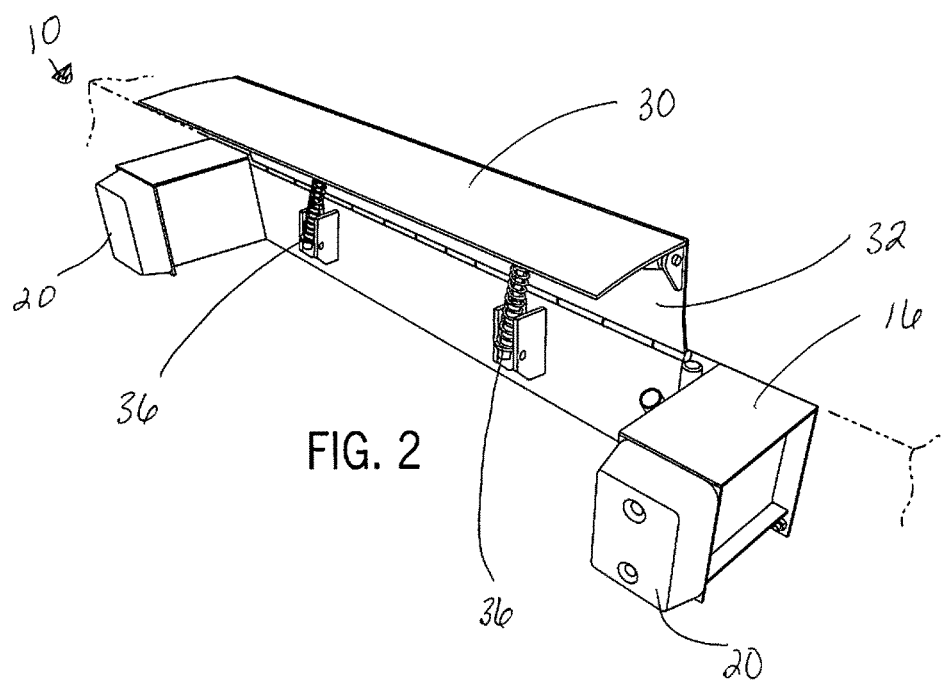
FIG. 2 is a perspective view of the dock leveler in FIG. 1.

The use of two springs (either gas springs 48 or metal springs 36) on heavier capacity units as seen in FIG. 2, creates a more balanced deck that allows safe operation on heavier plates, therefore increasing the bridge capacity of dock leveler unit 10.

Having two separate lift points (two springs) provides the ability to change the operator's hand position for pulling backward on mechanical assist bar 42. When pushing the mechanical assist bar 42 forward with the old prior art, once the lip extension mechanism released it would translate the downward force of the plates through the lifting bar, pulling the operator towards the truck or off the dock. Dock leveler 10 is an improvement over this.

Figure 11:
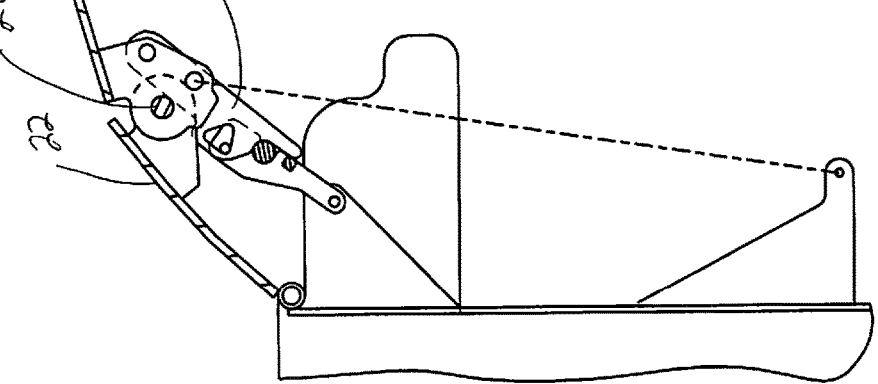
Figure 10:
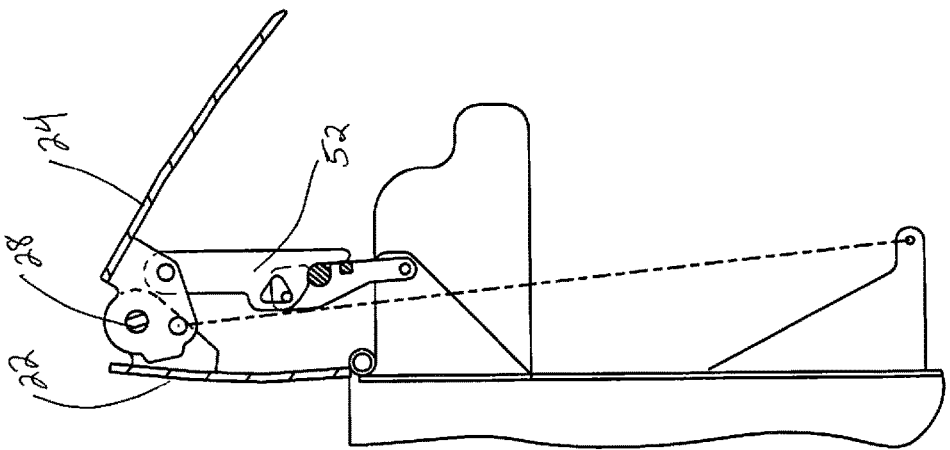

FIGS. 7-12 illustrate a second embodiment of dock leveler 10 and the process of extending and retracting lip 22. As lip 22 rotates backward (FIG. 9) this forces the linkage 52 to rotate into a locked position creating a fixed link which forces lip 22 outward and up (FIGS. 10 and 11). As lip 22 continues to rotate downward (FIGS. 11 and 12) the lip shaft will force linkage 52 out of alignment causing it to separate.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A dock leveler for an edge of a loading dock and being operable between an extended/engaged position and a retracted/disengaged position, comprising:

a frame mounted to the edge of a loading dock and including two opposed bumper sections;

a lip having a distal portion and a proximal portion, the distal and proximal portions being hingedly connected at a pivot point, the proximal portion also being hingedly connected to the frame, the lip having a top side and a bottom side and able to be activated between an extended/engaged position with a truck bed and a retracted/disengaged position;

at least one lift assist spring connected on a first end to the bottom side at the pivot point and connected on a second end to the frame, the location of the at least one lift assist spring will cause the distal and proximal portions to rotate together and onto a top of a truck trailer;

a mechanical assist bar operated by a user to move the lip between the extended/engaged and retracted/disengaged positions; the mechanical assist bar will extend the lip to the extended/engaged position forcing the at least one lift assist spring to move from a position behind the pivot point into a position forward of the pivot point and into a loading position, in the retracted/disengaged position the at least one lift assist spring is behind the pivot point which keeps the lip from accidentally rotating into the extended/engaged position; and wherein by attaching the lip assist spring to the bottom side of the distal lip portion, (a) the force exerted on the lip causes it to maintain closure at the pivot point between the distal and proximal lip portions when in the extended/engaged position; (b) the distance between the lift assist spring and lip is minimized thereby dampening a fall distance when the lip becomes unsupported by a truck trailer; (c) as the lip rotates in a backward direction this forces a linkage to rotate into a locked position creating a fixed link which forces lip outward and up as lip continues to rotate in a downward direction the lip will force the linkage out of alignment causing it to separate; and (d) the amount of force needed by a user to actuate the mechanical assist bar is minimized.

2. The dock leveler of claim 1 wherein when the lip is resting on a truck trailer there is no separation between the distal and proximal portions.

3. The dock leveler of claim 1 wherein the stronger and larger the at least one lift assist spring is, less force is needed by an operator to move the mechanical assist bar.

4. The dock leveler of claim 1 wherein by minimizing the distance between the at least one lift assist spring location and the pivot point facilitates closure of the proximal and distal portions together when the lip is unsupported by the truck trailer.

5. The dock leveler of claim 1 wherein the dock leveler can be mounted onto an end of a mobile loading dock or a stationary loading dock.

6. The dock leveler of claim 1 wherein the lift assist spring is a gas spring having compressed gas, a cylinder and a piston.

7. The dock leveler of claim 1 wherein the at least one lift assist spring is a metal spring.

8. The dock leveler of claim 1 wherein the at least one lift assist spring is a gas spring.

9. The dock leveler of claim 1 wherein the at least one lift assist spring is two lift assist springs positioned equidistant from each other.

* * * * *